United States Patent
Fichtner et al.

(10) Patent No.: US 7,362,027 B2
(45) Date of Patent: Apr. 22, 2008

(54) ELECTRIC MACHINE WITH A LAMINATED ROTOR CORE

(75) Inventors: Siegfried Fichtner, Allersberg (DE); Jürgen Hofmann, Spalt (DE); Karl Müssig, Nürnberg (DE); Daniel Verhoeven, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 256 days.

(21) Appl. No.: 10/789,411

(22) Filed: Feb. 27, 2004

(65) Prior Publication Data

US 2004/0195930 A1 Oct. 7, 2004

(30) Foreign Application Priority Data

Feb. 28, 2003 (DE) ............... 103 09 161

(51) Int. Cl.
*H02K 15/02* (2006.01)
*H02K 17/16* (2006.01)

(52) U.S. Cl. ............ 310/217; 310/211; 310/261; 310/42

(58) Field of Classification Search ........ 310/211, 310/261, 217
See application file for complete search history.

(56) References Cited

U.S. PATENT DOCUMENTS

| | | | | |
|---|---|---|---|---|
| 538,344 | A | * | 4/1895 | Penn et al. ............ 310/264 |
| 1,435,357 | A | | 11/1922 | Weber |
| 1,467,938 | A | * | 9/1923 | Janette ............ 403/252 |
| 2,003,587 | A | * | 6/1935 | Fahlman ............ 310/211 |
| 2,421,115 | A | * | 5/1947 | Carlson ............ 29/598 |
| 2,499,390 | A | * | 3/1950 | Joy ............ 310/211 |
| 2,949,553 | A | * | 8/1960 | Benoit ............ 310/162 |
| 5,704,111 | A | | 1/1998 | Johnson et al. |
| 6,122,817 | A | * | 9/2000 | Meacham et al. ............ 29/598 |

FOREIGN PATENT DOCUMENTS

| | | |
|---|---|---|
| CH | 665 063 A5 | 4/1988 |
| DE | 195 25 704 A1 | 7/1996 |

* cited by examiner

*Primary Examiner*—Burton Mullins
(74) *Attorney, Agent, or Firm*—Henry M. Feiereisen; Ursula B. Day

(57) ABSTRACT

An electric machine includes a shaft and a rotor core mounted onto the shaft and formed of a plurality of stacked laminations. The rotor core has opposite end surfaces for attachment of a plate in such a manner as to allow an axial deflection of the laminations in the area of the plate.

14 Claims, 6 Drawing Sheets

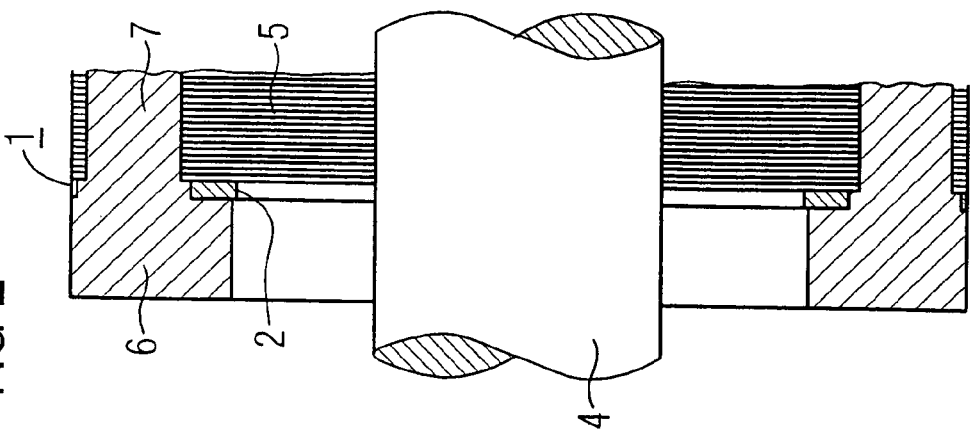
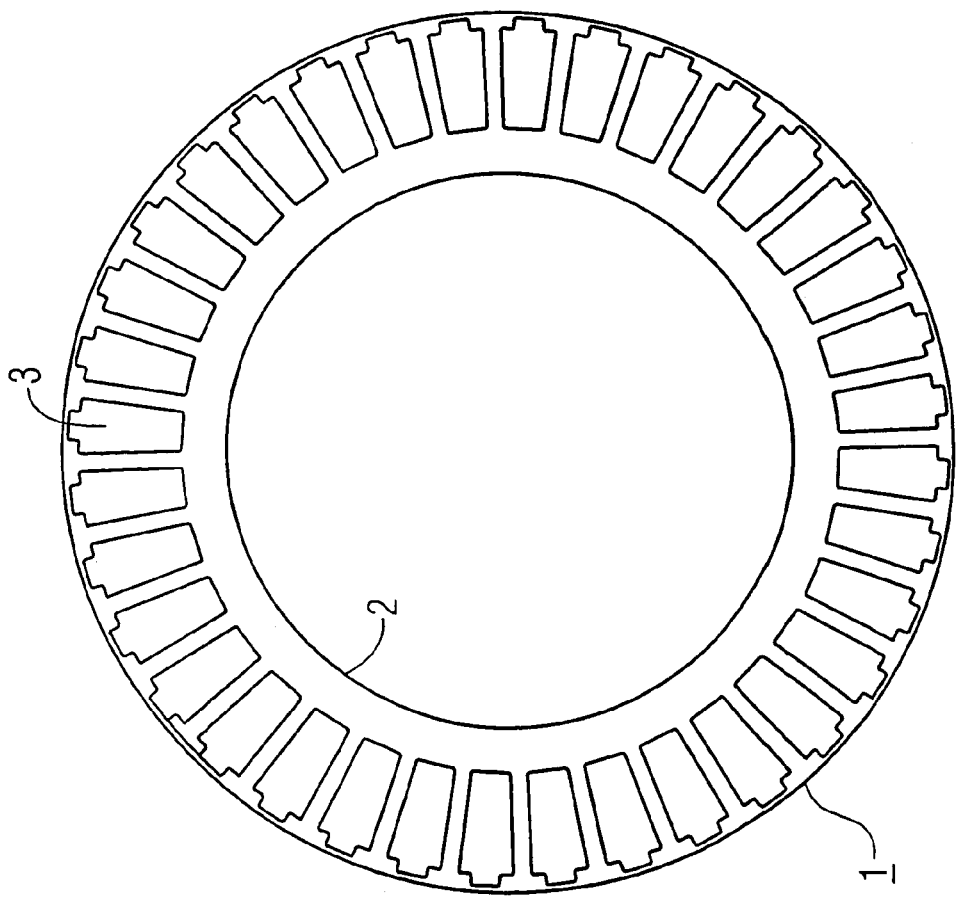

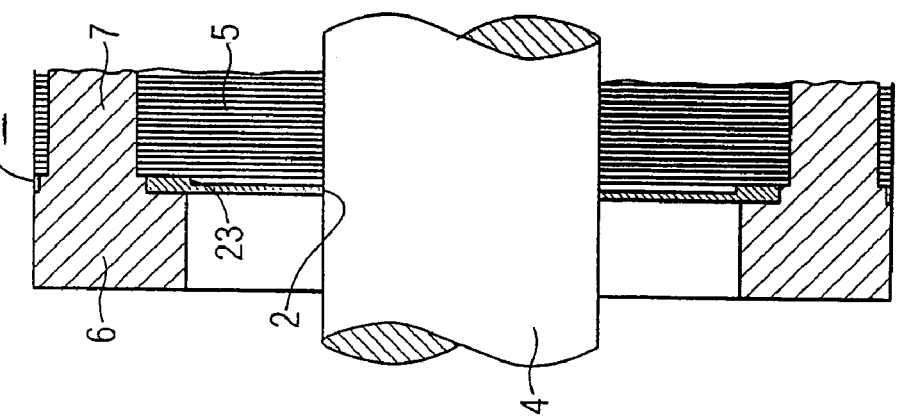
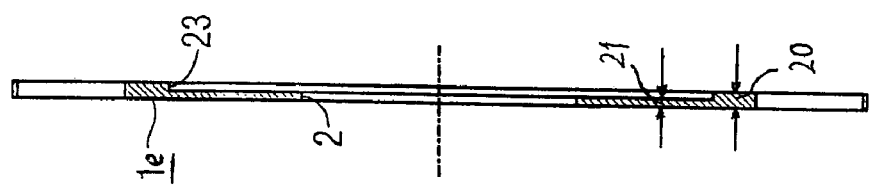
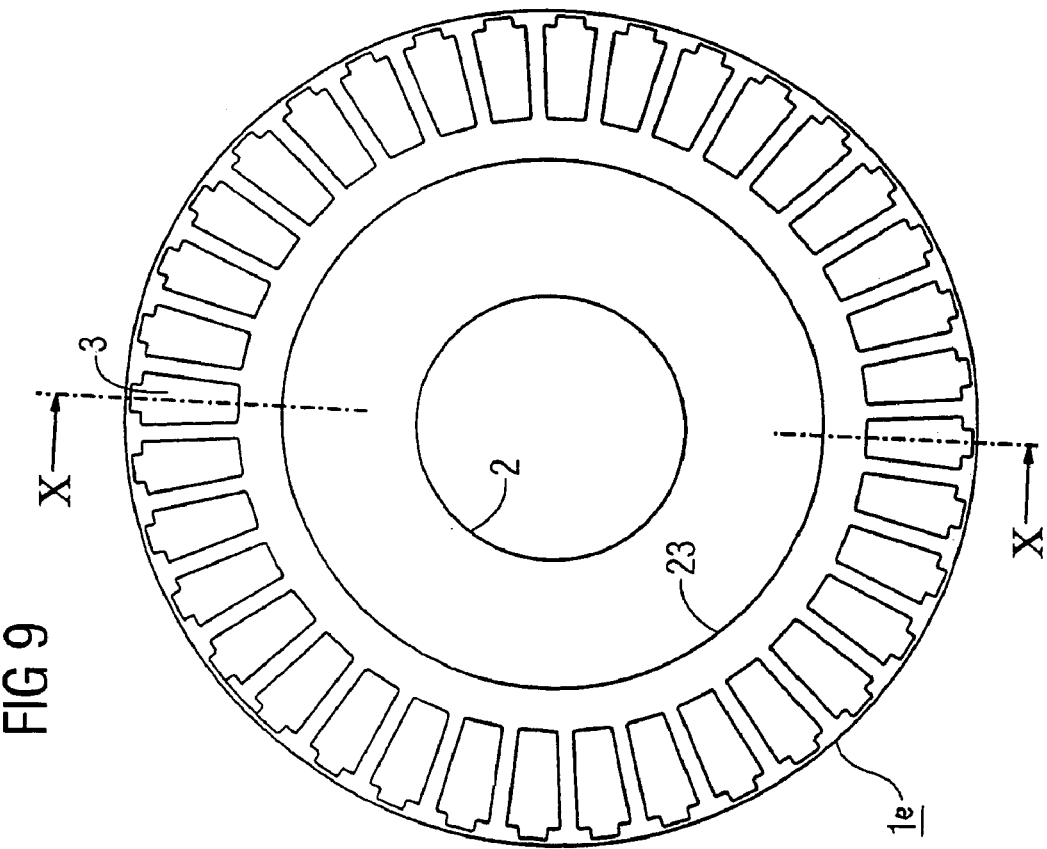

US 7,362,027 B2

ELECTRIC MACHINE WITH A LAMINATED ROTOR CORE

CROSS-REFERENCES TO RELATED APPLICATIONS

This application claims the priority of German Patent Application, Serial No. 103 09 161.0, filed Feb. 28, 2003, pursuant to 35 U.S.C. 119(a)-(d), the disclosure of which is incorporated herein by reference.

BACKGROUND OF THE INVENTION

The present invention relates, in general, to an electric machine with a laminated rotor core An electric machine of a type typically involved here includes a rotor having a rotor core which is mounted onto a shaft and formed of a plurality of stacked laminations. The rotor core carries the winding in the form of rotor bars in slots about its outer periphery, whereby the bars are connected to conducting end rings on each end. The laminated stack is provided at its end surfaces with plates that have a same cross section as the laminations of the rotor core. The plates are made of a material which is different as, e.g. the rotor bars of a squirrel-cage rotor. In view of the different materials, an aluminum cage shrinks twice as much as the surrounding lamination stack, after, e.g., a casting process. As a consequence, in particular the area of the end rings is exposed to substantial forces that tend to compress the laminated stack toward the center. When the plates, except for the slots, have a same geometry as the laminations, the end surfaces of the laminated stack undergo a constriction of the shaft bore because an axial movement of the laminations is substantially prevented.

Without the provision of special measures, it is impossible to place the shaft into the laminated stack because the necessary axial joining force to be applied in order to realize the connection becomes too great. In addition, an excessive local overmeasure may also lead to a "seizing" upon the shaft, leading to damage of the components and the rotor and ultimately to their destruction.

It would therefore be desirable and advantageous to provide an improved electric machine to obviate prior art shortcomings and to enable a compact construction of the laminated rotor core while still allowing an axial movement of the laminated stack during manufacture and simplifying the manufacture.

SUMMARY OF THE INVENTION

According to one aspect of the present invention, an electric machine includes a shaft, and a rotor core mounted onto the shaft and formed of a plurality of stacked laminations, wherein the rotor core has opposite end surfaces for attachment of a plate in such a manner as to allow an axial movement of the laminations in the area of the plate.

The present invention resolves prior art problems by providing an additional axial movement range for the laminations during the casting operation and especially during joining of the shaft, which movement range is almost equal to a construction without end plates.

According to another feature of the present invention, the plate may have an inner diameter which is greater than an inner diameter of the rotor core, preferably by at least 2 mm. In this way, the plate is held in position in radial direction only by the rotor bars.

According to another feature of the present invention, the plate may also be configured in the form of a sleeve-like plate in surrounding relationship to the shaft.

According to another feature of the present invention, the plate may have at least three webs extending substantially radially inwardly to realize a radial disposition of the plate on the shaft. By providing the radial webs to extend to the outer diameter of the shaft, the plate is fixed in relation to the shaft, as may be required for example to maintain integrity or for safety concerns during operation. The individual webs exhibit hereby a greater flexibility in axial direction of the laminated stack than a closed ring. As a result, seizing is prevented, when the shaft is joined to the laminated stack as the webs yield in axial direction.

In order to positively prevent a seizing of the webs when contacting the shaft diameter, the webs may be constructed to exhibit flexibility in radial direction. For example, the webs may be formed with a slit in circumferential direction or material may be removed by laser in particular in the end region of the webs, i.e. in the area of the shaft, to realize the radial flexibility. Thus, the webs may deflect in radial direction and thus prevented from penetrating the shaft material when the shaft is inserted in the shaft bore of the rotor core.

As an alternative, or in addition to the afore-described measures, it may also be possible to plastically deform the webs in a preceding working step to slightly enlarge the defined inner diameter of the webs.

Suitably, the plates, when used as part of a die casting tool, may be constructed to prevent shrinkage cavitation, e.g. recesses such as vent slits.

According to another feature of the present invention, at least one of the webs may be provided with a fitted key for realizing an angular alignment of the plate in relation to the shaft or to a stacking mandrel.

According to another feature of the present invention, the plate may be formed with slots for accommodation of rotor bars, and recesses for operation of the electric machine or its manufacture.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a plan view of a first embodiment of a plate according to the present invention for attachment to a rotor core;

FIG. 2 is a partly sectional view of a rotor core with attached plate of FIG. 1 and mounted onto a shaft;

FIG. 9 is a plan view of a sixth embodiment of a plate according to the present invention;

FIG. 10 is a side sectional view of the plate of FIG. 9; and

FIG. 11 is a partly sectional view of a rotor core with attached plate of FIG. 9 and mounted onto a shaft;

DETAILED DESCRIPTION OF PREFERRED EMBODIMENTS

Figure 3:
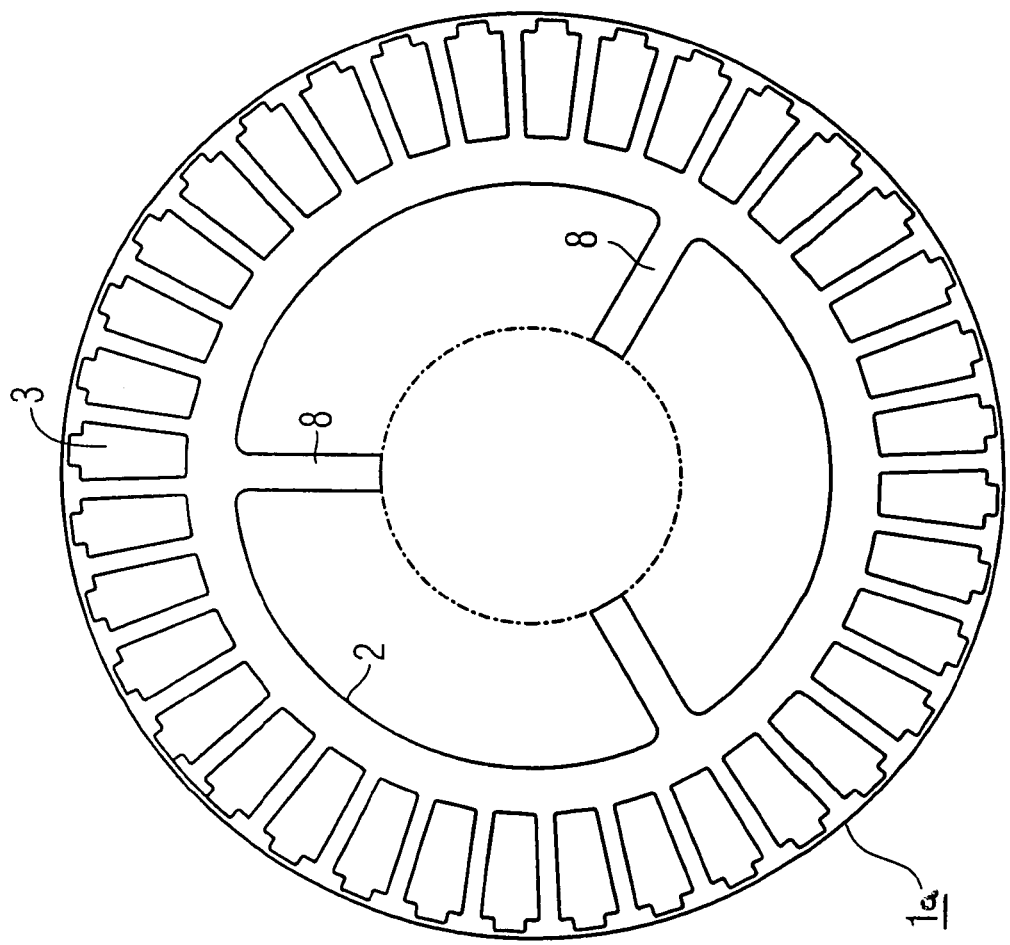
FIG. 3 is a plan view of a second embodiment of a plate according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a plan view of a first embodiment of a plate 1 according to the present invention, for attachment to an end of a rotor core which is shrink-mounted onto a shaft 4 and formed of a plurality of stacked laminations 5, as shown in FIG. 2. The plate 1 has a plurality of slots 3 about its outer periphery for receiving rotor bars 7 which extend through aligned slots in the laminations 5 and connected to conducting rotor end rings 6 on each end. The plate 1 is defined by an inner diameter 2 which is greater than an outer diameter of the shaft 4. The slots 3 are radially closed to the outside in order to be able to absorb also radial forces of the rotor bars 7 during operation of an electric machine, not shown in detail here. It will be appreciated by persons skilled in the art that the electric machine must contain much mechanical apparatus which does not appear in the foregoing Figures. However, this apparatus, like much other necessary apparatus, is not part of the invention, and has been omitted from the Figures for the sake of simplicity.

Although the slots 3 are shown here as being closed in radial direction, the rotor bars 7 may, of course, also be received in open or partly closed slots. Radial forces may also be absorbed through suitable configuration of the slots 3, e.g. by a drop shape or rhomboidal shape. In dependence on the rotation speed and the material selection, operation of the electric machine may also involve the use of some laminations 5 with radially closed slots 3. For manufacturing reasons, the provision of radially closed slots 3 is currently preferred because poured liquid material, such as copper or aluminum for realizing the bars 7, is prevented from escaping in radial direction. However, in the event of open or partly closed slots 3, the escape of liquid material can be prevented by taking suitable measures such as providing wedges or plugs etc. during a casting process at normal pressure or elevated pressure.

FIG. 2 shows the rotor core with attached plate 1 for securing the laminated stack 5 of the rotor. The slots 3 of the plate 1 and the laminated stack are cast with electrically conductive material, in particular aluminum and copper, and form the end rings 6 at the ends of the laminated stack 5. The inner diameter 2 of the plate 1 is hereby set back in relation to the diameter of the shaft 4 to thereby provide an axial mobility of the laminated stack 5, in particular during and after the casting process and during placement of the shaft 4 in the shaft bore of the rotor core. Suitably, the inner diameter 2 of the plate 1 is greater than the inner diameter of the rotor core 5, preferably by at least 2 mm. The plate 1 is hereby held in place solely by the rotor bars 7.

FIG. 3 shows a second embodiment of a plate according to the present invention and designated by reference numeral 1a. Parts corresponding with those in FIG. 1 are denoted by identical reference numerals and not explained again. The description below will center on the differences between the embodiments. In this embodiment, the plate 1a is formed with three radial webs 8 which extend to the outer diameter of the shaft 4 indicated here by dash-dot line. The webs 8 have a width which ranges from 4 to 20 mm depending, i.a., on the shaft diameter. The flexibility of the webs 8 can be enhanced with decreasing thickness of the webs 8 so as to prevent a cutting or seizing of the webs into the shaft material, when the shaft is connected to the laminated stack 5 of the rotor core.

Through provision of the webs 8 to bear upon the outer diameter of the shaft 4, the plate 1 can be held in place in relation to the shaft 4. Currently preferred is hereby the provision of at least three webs 8.

Figure 4:
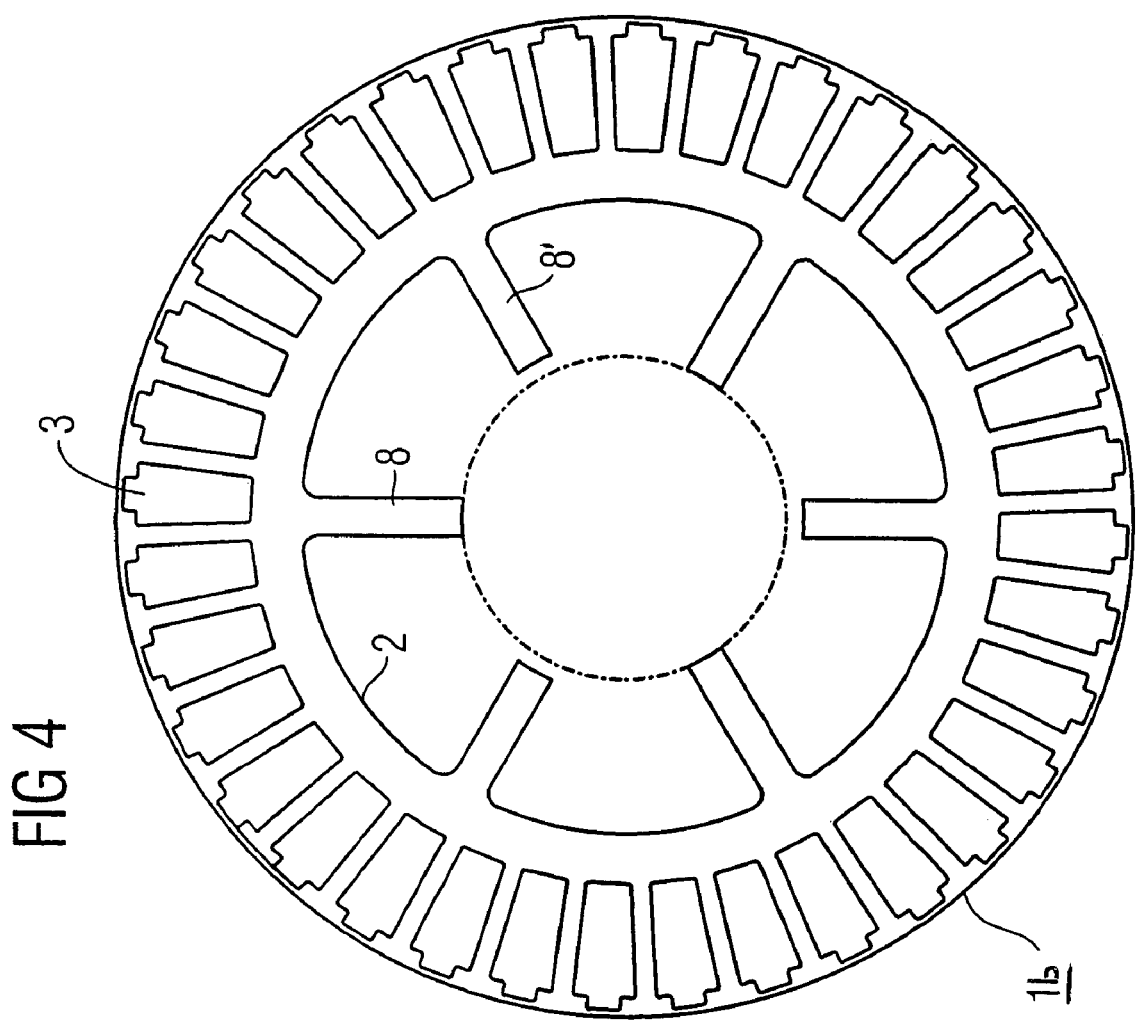
FIG. 4 is a plan view of a third embodiment of a plate according to the present invention.

FIG. 4 shows a similar embodiment of a plate according to the present invention and designated by reference numeral 1b which differs from the embodiment of FIG. 3 by the provision of three further webs 8' which extend radially inwards from the inner diameter 2 of the plate 1b but end short of the outer diameter of the shaft 4.

Figure 6:
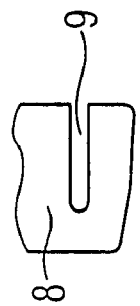
FIG. 6 is an enlarged detailed view of the area encircled in FIG. 5 and marked VI.
Figure 7:
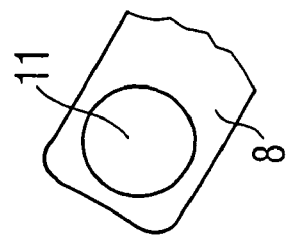
FIG. 7 is an enlarged detailed view of the area encircled in FIG. 5 and marked VII.
Figure 5:
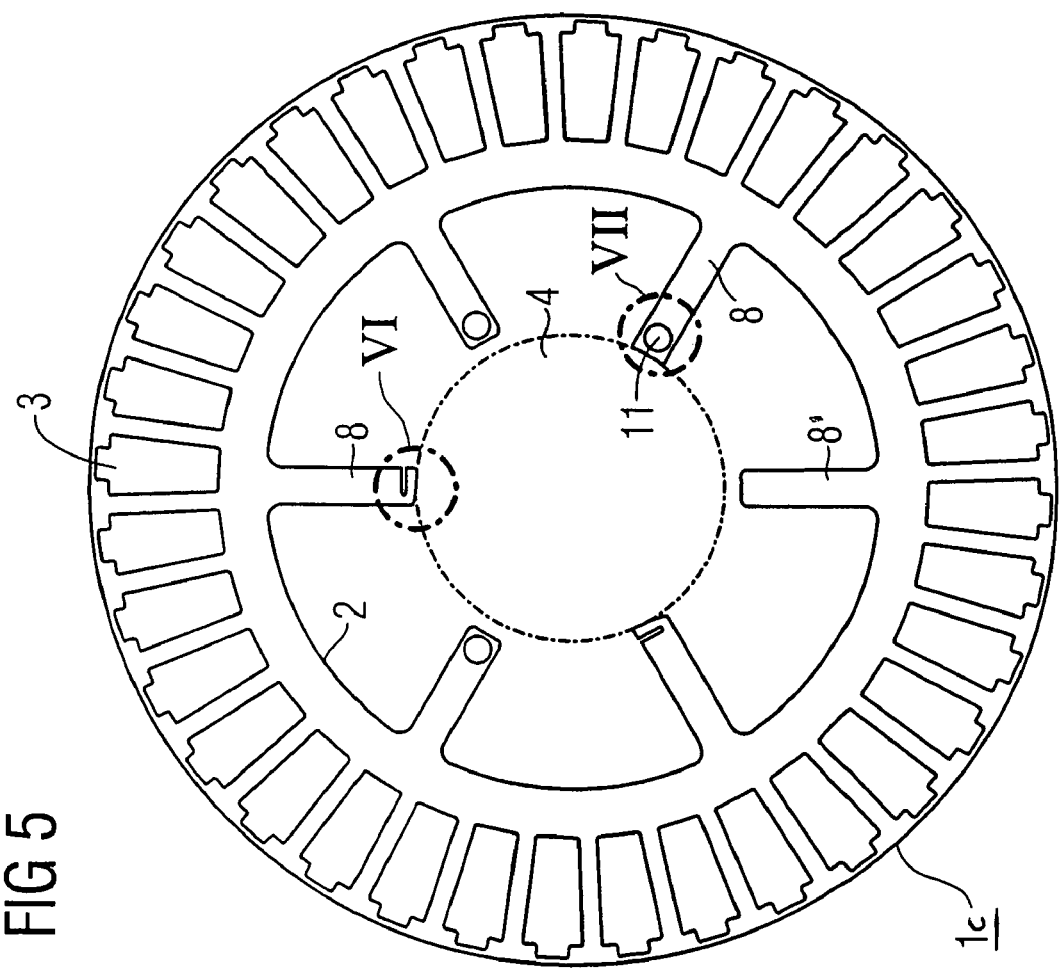
FIG. 5 is a plan view of a fourth embodiment of a plate according to the present invention.

FIG. 5 shows a further embodiment of a plate according to the present invention and designated by reference numeral 1c which resembles the embodiment of FIG. 4 but is provided with further measures to prevent a cutting of the webs 8 into the shaft material during connection of the shaft 4 in the rotor core. As shown by way of example in combination with FIG. 6, at least some (here two) of the webs 8 can be formed in proximity to the shaft 4 with a slot 9 which extends in circumferential direction, or as shown by way of example in combination with FIG. 7, some (here three) of the webs 8, 8' may be formed with a hole 11. As a result of the formation of slits 9 or holes 11, the radial flexibility is enhanced and a radial deflection of the webs 8 is ensured, when the shaft 4 is connected to the rotor core so as to prevent a penetration of the webs 8 or 8' into the shaft material.

It is, of course, also conceivable to deform the webs 8 in a further working step before connecting the shaft 4 in order to slightly enlarge the defined inner diameter 2 of the webs 8.

Figure 8:
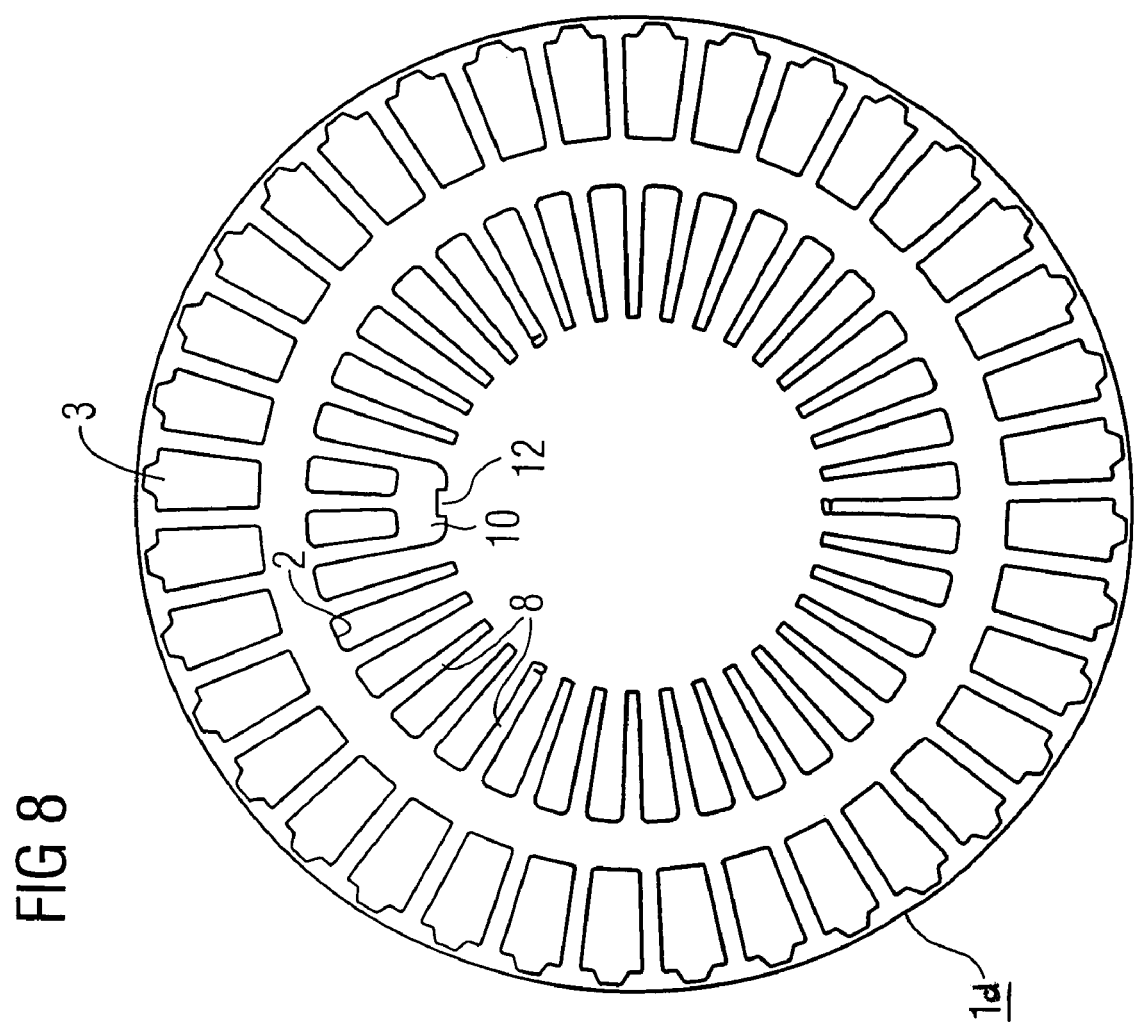
FIG. 8 is a plan view of a fifth embodiment of a plate according to the present invention.

Turning now to FIG. 8, there is shown a further embodiment of a plate according to the present invention and designated by reference numeral 1c. Parts corresponding with those in FIG. 1 are again denoted by identical reference numerals and not explained again. The description below will center on the differences between the embodiments. In this embodiment, the plate 1d is provided with a greater number of webs 8 to extend in the direct ion of the shaft 4 for increasing the strength and stability of the plate 1d. Hereby, one web 10 or a combination of a predetermined number of webs may be used to effect an angular disposition of the plate 1d in relation to the shaft 4 or a stacking mandrel (not shown) by providing a fitted key 12.

FIG. 9 shows a further embodiment of a plate according to the present invention and designated by reference numeral 1e which has a sleeve-like configuration in the direction of the laminated stack 5 to allow an axial displacement of the adjacent laminations. To realize such a plate 1e in a simple manner, the plate 1e has one side which confronts the laminated stack 5 and is treated by a material removal step to form a recess 23, as shown in particular in FIG. 10. Material removal may be realized by any suitable machining process, e.g. turning. Turning results in the formation of a gradation to provide the recess 23, whereby in this embodiment the plate 1e has an inner diameter which bears upon the outer diameter of the shaft 4, as shown in FIG. 11. In this way, a different axial expansion of the plate 1*e* is realized (FIG. 10) which allows an axial movement during manufacture of the laminations in the area of the plate 1*e*, even though the plate 1*e* is in direct contact with the shaft 4.

The plate 1*e* may also be configured into this manner by a suitable shaping step.

The plate 1*e* is hereby configured in such a way that the inner axial width 20 thereof is about twice as wide than the outer axial width 21.

Suitably, the plate 1, 1*a*-1*e* according to the present invention is made of high-strength material, e.g. steel, that is especially suitable for cost-reasons.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
   a shaft; and
   a rotor core mounted onto the shaft and formed of a plurality of stacked laminations, said rotor core having opposite end surfaces for attachment of a plate in such a manner as to allow an axial deflection of the laminations in the area of the plate, said plate having a rotor core distal planar outer surface and extending to an area of the shaft, wherein the plate has an inner diameter which is greater than an inner diameter of the rotor core.

2. The electric machine of claim 1, wherein the inner diameter of the plate is greater than the inner diameter of the rotor core by at least 2 mm.

3. An electric machine, comprising:
   a shaft; and
   a rotor core mounted onto the shaft and formed of a plurality of stacked laminations, said rotor core having opposite end surfaces for attachment of a plate in such a manner as to allow an axial deflection of the laminations in the area of the plate, wherein the plate has at least three webs extending substantially radially inwardly to hold the plate radially on the shaft.

4. The electric machine of claim 3, wherein the webs have a width in the range from 4 to 20 mm.

5. The electric machine of claim 3, wherein at least one of the webs has means for providing flexibility in a radial direction.

6. The electric machine of claim 5, wherein the at least one web is formed with a slit in circumferential direction to provide the radial flexibility.

7. The electric machine of claim 5, wherein the at least one web is formed with a hole to provide the radial flexibility.

8. The electric machine of claim 5, wherein the material in the at least one web is reduced by laser application to provide the radial flexibility.

9. The electric machine of claim 8, wherein the at least one web has a shaft-proximal end zone from which material is removed by laser application to provide the radial flexibility.

10. The electric machine of claim 4, wherein the webs define an inner diameter, said webs being plastically deformed to slightly enlarge the inner diameter of the webs.

11. The electric machine of claim 5, wherein at least one of the webs is provided with a fitted key for providing an angular alignment of the plate in relation to the shaft.

12. An electric machine, comprising:
    a shaft; and
    a rotor core mounted onto the shaft and formed of a plurality of stacked laminations, said rotor core having opposite end surfaces for attachment of a plate in such a manner as to allow an axial deflection of the laminations in the area of the plate, wherein the plate is formed with slots for accommodation of rotor bars, and recesses for operation of the electric machine or its manufacture.

13. An electric machine, comprising:
    a shaft; and
    a rotor core mounted onto the shaft and formed of a plurality of stacked laminations, said rotor core having opposite end surfaces for attachment of a plate in such a manner as to allow an axial deflection of the laminations in the area of the plate, said plate having a rotor core distal planar outer surface and extending to an area of the shaft, wherein the plate is constructed as a sleeve having a recessed inner surface in confronting relationship to the rotor core, thereby defining a gap between the plate and the rotor core.

14. The electric machine of claim 13, wherein the plate has an inner diameter so as to bear upon an outer diameter of the shaft.

* * * * *